Nov. 20, 1945.    W. J. MILLER ET AL    2,389,163
APPARATUS AND METHOD FOR FEEDING CLAY TO CAVITOUS JIGGER MOLDS
Filed May 14, 1942    2 Sheets-Sheet 1
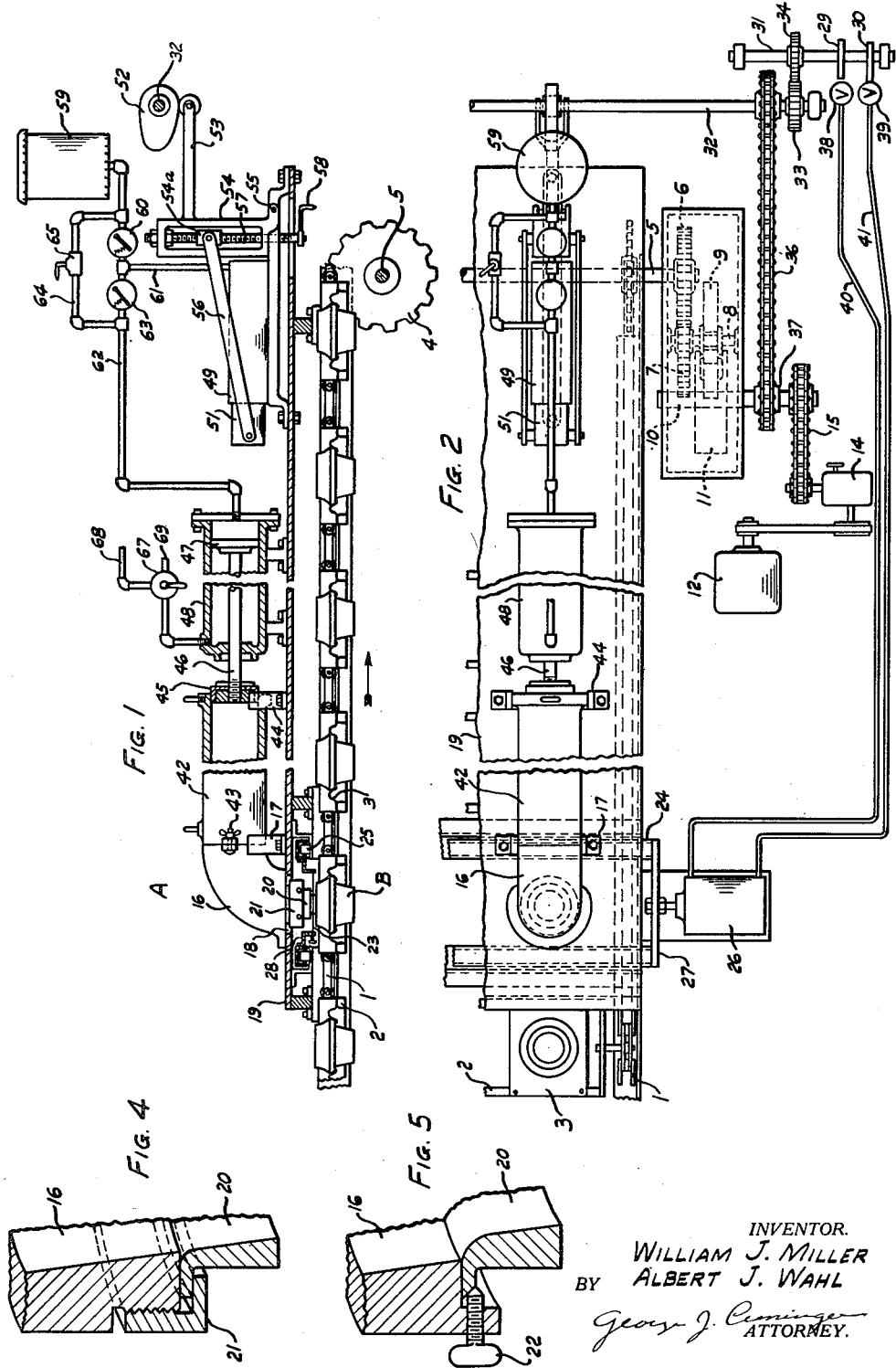
INVENTOR.
WILLIAM J. MILLER
BY ALBERT J. WAHL
George J. Cuminger
ATTORNEY.

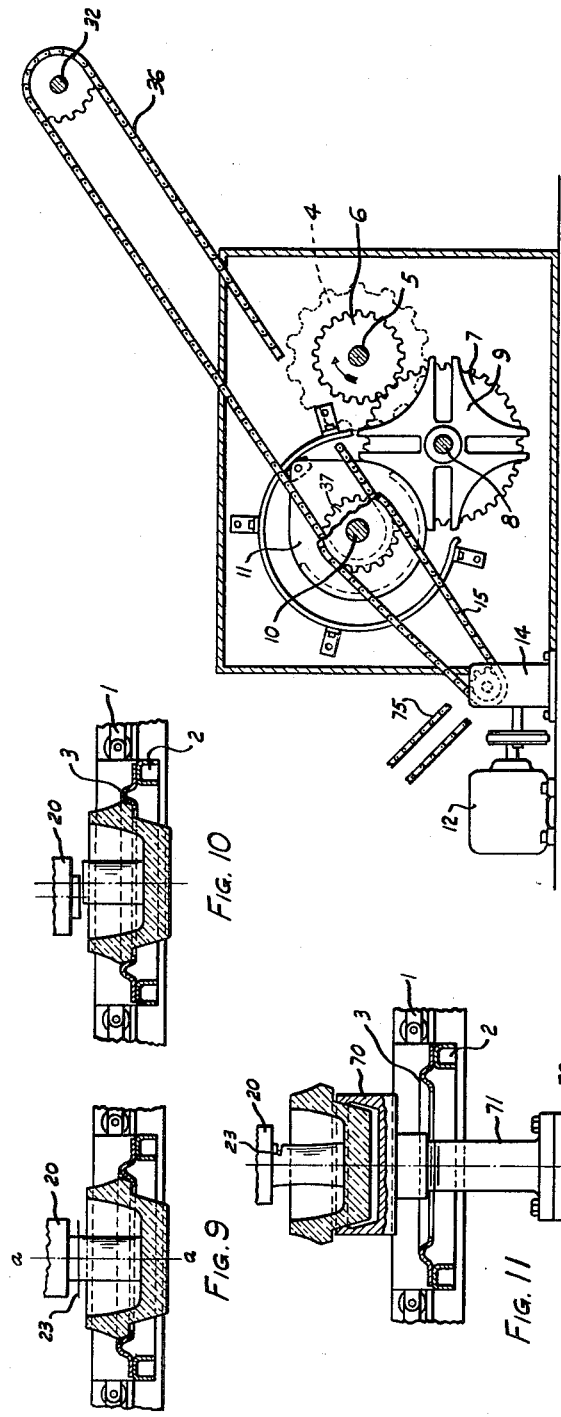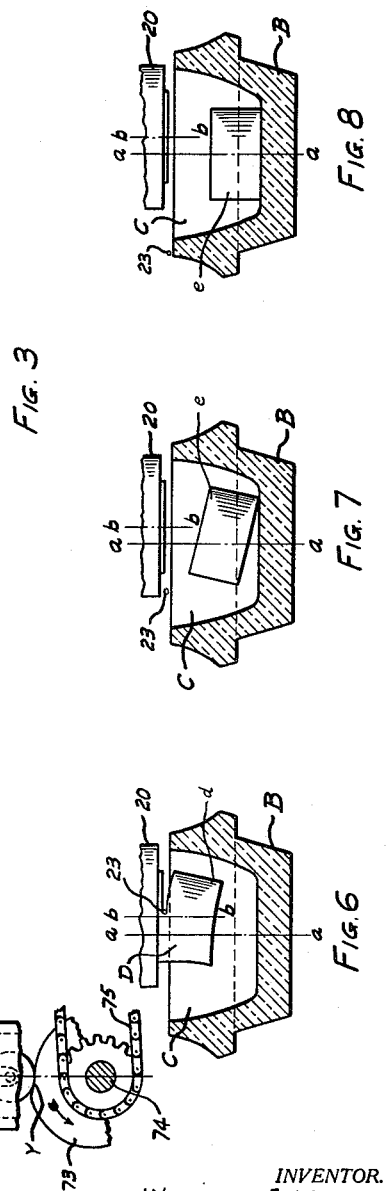

Patented Nov. 20, 1945

2,389,163

UNITED STATES PATENT OFFICE 2,389,163

APPARATUS AND METHOD FOR FEEDING CLAY TO CAVITOUS JIGGER MOLDS

William J. Miller, Swissvale, and Albert J. Wahl, Pittsburgh, Pa., assignors, by direct and mesne assignments, to Miller Pottery Engineering Company, Swissvale, Pa., a corporation of Pennsylvania Application May 14, 1942, Serial No. 442,920

11 Claims. (Cl. 25—22)

This invention relates to the apparatus and method for feeding of clay to cavitous jigger molds such as cups, bowls and the like referred to hereinafter as hollow ware.

In the mechanical automatic manufacture of jiggered hollow ware, the molds are advanced along a path wherein clay is automatically fed thereto and formed on the molding surface thereof. One object of this invention is to reduce the time interval required to feed clay to individual molds by eliminating causes of time lag which have prevailed heretofore, thereby increasing the rate of speed at which molds may be charged in an automatic system.

It is also an object of this invention to provide for accurately controlling the quantity or volume of clay in successive charges of clay and to produce symmetrical charges and deposit them in properly centered position at the bottom of the molding cavity so that the clay may be spread uniformly over the molding surface of the mold to a given thickness with a minimum of waste or excess material.

In the drawings:

Fig. 1 is a plan view of the preferred form of apparatus comprising our invention.

Fig. 2 is an elevation, partly in section, taken in the direction of arrows 2—2 of Fig. 1.

Fig. 3 is a side elevation of the apparatus shown in Fig. 1.

Figs. 4 and 5 are fragmentary details illustrating different methods of adjustably mounting the feeder nozzle.

Figs. 6, 7 and 8 illustrate the sequence of operations in cutting off and depositing a charge of clay in the mold.

Figs. 9 and 10 illustrate how the clay may be fed all the way to the bottom of the mold and then cut off on the bias to insure separation.

Fig. 11 illustrates how a mold lifter may be incorporated in the apparatus.

While any type of mold transporting means may be employed, we prefer a double strand endless chain mold conveyor 1, Figs. 1 and 2, with trays 2 pivotally suspended between opposite chains in equally spaced relation. Each tray has one or more open bottom mold stands 3 dowelled in place on the tray bars, for receiving and supporting the molds by the brims thereof, see Figs. 9 and 10.

A is a clay feeding or mold charging station where each mold is stopped to receive a given quantity of material. The chain conveyor may pass through other stations including a preforming position where the clay is pressed or spread out to cover the ware forming surface of the mold, a jiggering station where the previously preformed clay is profiled, a dryer and a stripping station none of which have been illustrated and are mentioned merely to identify the type of production system to which the present method of and means for feeding clay is suited.

Throughout its length, the conveyor will be supported by pairs of idler sprockets similar to that shown at 4 on shaft 5. Numeral 4, however, represents drive sprockets which are intermittently rotated by means of a gear 6 directly driven by a gear 7 on Geneva shaft 8 (see Fig. 3). 9 is a four point Geneva on the same shaft which is given a quarter turn each revolution of shaft 10 by a motion plate 11. Shaft 10 is driven by motor 12, variable speed transmission 14 and sprocket chain 15.

16 is a tube in the form of a 90° elbow supported at the rear by a cradle 17. The discharge end of the tube projects downwardly through a hole 18 in the floor plate 19 and has a radially adjustable nozzle 20 secured thereto either by a flanged screw collar 21, Fig. 4, or by several set screws 22, Fig. 5.

The lower or outlet end of the nozzle 20 preferably lies in very close proximity to the top surface of the molds B with just sufficient clearance therebetween to permit a tensioned cutting wire 23 to pass through. Having the nozzle tip close to the top of the mold makes it necessary to drop the charge of clay only a short distance to the bottom of the molding cavity and provides for better control over spotting the charge in a desired location and also reduces the elapsed time between cutting off and actual deposit on the molding surface.

We desire to move the cutting wire through the material at a rapid pace and in the form of apparatus illustrated we desire to immediately retract the wire once the charge is cut off. The wire is suspended from an overhead frame 24 mounted on rollers 25 to be shifted transversely of the mold conveyor by a pressure fluid operated motor 26 connected to one of the end members 27 of the frame 24. The wire is suspended below the frame by depending brackets 28 attached to the side bars of the frame. To operate the cutter frame 24 in the manner aforesaid, we provide cams 29 and 30 on camshaft 31 rotated by shaft 32 through gears 33 and 34 having a 1 to 1 ratio. Gear 33 is mounted on cam shaft 32 rotated by sprocket chain 36 connected to a sprocket 37 on shaft 10. Cams 29 and 30 control the opening and closing of valves 38 and 39 respectively in fluid lines 40 and 41 leading to the motor 26.

42 is a portable refillable magazine which may be filled with clay at the mouth of an extrusion machine. Said magazine is adapted to hold sufficient clay for a large number of mold charges and is secured in leakproof sealed relation to the inlet end of tube 16 by clamps 43. The other end of the magazine rests in a cradle 44 bolted to the floor plate and is positioned thereby in alignment with the rear end of the tube 16.

Clay is forced from the magazine 42 into the tube 16 by hydraulic pressure actuated means which includes a clay engaging ram 45 mounted on a piston rod 46 having a piston 47 on the other end thereof associated with hydraulic cylinder 48. Piston 47 is moved forwardly in cylinder 48 by pressure fluid pumped into the cylinder by pump 49. The pump piston 51 is actuated by a cam 52 on cam shaft 35 which depresses a lever 53 each revolution thereof to thereby tilt frame 54 on its bearings 55 and thus cause the pump piston to make a delivery stroke. The straps 56 which connect the pump piston to the frame 54 are pivotally attached to a nut 54a on screw 57. The screw has a crank 58 by means of which the stroke of the pump piston, and consequently the volume of fluid delivered by the pump, may be regulated. Since the fluid delivered by the pump is substantially incompressible and the clay in magazine 42 has the same property, the volume of fluid delivered by the pump is proportional to the volume or amount of clay extruded through the outlet of nozzle 20. Thus crank 58 provides means for regulating the volume of clay extruded through nozzle 20.

On the idle stroke, piston 51 draws pressure fluid from tank 59 through check valve 60 and pipe 61 into the pump cylinder. On the delivery stroke, fluid is forced through pipe 62 past check valve 63 into the ram cylinder. After piston 51 has reached the end of its forward travel, which should occur concurrently with the emptying of magazine 42 of clay, it is reversed by opening valve 67 which permits air under pressure in line 68 to enter the cylinder ahead of the piston. The pressure fluid behind the piston is forced through a by-pass 64 back into the tank 59. When the piston has been reversed, valve 65 is closed to shut off the by-pass and valve 67 is turned to shut off line 68 and open vent 69. When piston 45 is fully retracted, empty container 42 may be removed and replaced by one which is filled with clay.

The sequence of operations are as follows: a tray bearing a mold is moved into position directly below the outlet end of nozzle 20 and the conveyor stops. At the instant the outer end of the nozzle 20 registers with the mold cavity C, the extrusion of clay therethrough commences and the surface of cam 52 is so developed that a rapid extrusion will occur. The period of time required to extrude the clay will be in direct proportion to the length of time required for the cam 52 to move piston 51 regardless of the nozzle diameter or the length and diameter of the extrusion. After a given amount of material has been extruded, the cutting wire rapidly cuts across the column D and returns to initial position, the extrusion preferably being halted during the cutting stroke and thereafter until the next mold in line moves into position. It will be understood that the extrusion need not be entirely halted whilst the clay is being cut off. It may proceed at a very slow rate if desired and it is obvious that the surface of cam 52 may be developed to obtain such movement. Thus, when we say that the extrusion may be halted, we mean that it may either be stopped completely or allowed to proceed at a very slow pace.

The cylindrical charge of clay is preferably deposited in an upright, centered position on the floor of the molding cavity. A centering error may occur if the outlet of nozzle 20 and the mold therebelow are co-axial where the charge is cut in suspension. This is due to the tendency of the cutting wire to push the charge to one side as it is segregated and is also due to weight of the severed portion $d$, Figure 6, pulling the charge towards an off center position. We have found it to be advantageous to locate the outlet of nozzle 20 in an off center position, see centerline $b$—$b$, Figure 6, with reference to the vertical axis $a$—$a$ of the mold therebelow in the direction towards which the cut is made. Thus when charge $c$ is cut off in the off center position described, the leading end $d$ will strike the floor of the cavity first, Figure 7, in such position that the remainder of the charge will fall into centered, upright position, Figure 8. The extent to which the nozzle is moved off center will depend on such factors as the size, weight, and length of the charge and the dimensions of the molding cavity.

The clay is extruded within the mold itself by this system and does not have far to drop when cut off thereby greatly accelerating the speed with which the mold may be charged. Furthermore, the mold encloses and partly protects the charge from the outside atmosphere which may be laden with foreign material that would otherwise settle on the naked column if extruded and cut off whilst hanging above the top of the mold. By severing the column close up to the tip of the nozzle 20, there is little tendency on the part of the wire to drag the column to one side and thereby interfere with properly spotting the next succeeding charge.

If desired, the column of clay may be extruded downwardly until it touches the bottom of the molding cavity, see Figs. 9 and 10. In this case, the nozzle 20 would be adjusted to an "on center" position with respect to the axis of the mold and a bias cut made through the column. A bias cut can be obtained by simply lowering one end of the cutting wire relative to the other, however, the angle of the bias cut should be very slight in order not to appreciably tilt the next succeeding charge. The reason for cutting the charge on the bias is to promote reliable separation of the charge from the stub which will take place in the manner illustrated in Fig. 10.

It is preferred however to have clearance between the bottom of the charge and the bottom of the cavity at the time the charge is cut off in order that gravity may assist in making the separation complete. The column of clay may, if desired, be scored in the zone where the cut first commences in order to completely avoid any possibility of the charge of clay sticking to the parent stub. The preferred method of scoring the column of clay is illustrated and described in Patent No. 2,303,888 to William J. Miller.

Where the tube 16 and nozzle 20 are positioned higher than herein disclosed and it is not desired or cannot, because of space limitations, etc. be brought down closer to the conveyor, the molds may be lifted to the nozzle 20 by means of a mold lifter, Fig. 11, which comprises a chuck 70 on a stand 71 resting on a crosshead 72 which is intermittently raised and lowered at the feeding station A. After the mold has come to rest at the feeding position, the mold lifter elevates the mold at the same time the extrusion starts and the mold is carried up to a point where it encompasses the extrusion so that the distance the charge will have to drop will be at a minimum. The cutting wire, in this instance, will operate in close proximity to the top of the mold and the nozzle tip as in the other arrangement. The elevation of the chuck will be synchronized with the clay feeder and, if desired, the clay column may be fed downwardly inside the cavity until it contacts the bottom of the cavity and adheres thereto. Then, the mold lifter may be slightly lowered (see the drop y on the surface of cam 73) to place the clay in tension or pull down on the column, and then the column may be cut through. Pulling down on the clay helps the charge separate from the parent column. 74 represents a cam shaft which may be connected to the main drive shaft 10 by sprocket chain 75 in order to synchronize the movement of the chuck with the other apparatus such as the feeding, cutting and mold transporting means. If used, the sprocket chain 75 would connect to the shaft 10 at or about the point indicated on Fig. 3.

Changes may be made in the details of the apparatus without departing from the spirit and scope of this invention and we therefore intend to include obvious mechanical equivalents and modifications.

Having thus described our invention, what we claim is:

1. Apparatus for feeding clay charges to hollow ware molds, comprising in combination, conveying means for advancing hollow ware molds in single file along a path where clay is fed thereto, a nozzle thereabove, open top, cavitous pottery molds disposed thereon, the outlet end of which occupies a plane in close adjacency to the cavity inlet of the molds resting on the conveying means in order that material extruded therethrough may extrude directly into the molding cavity and into close adjacency to the floor of the cavity, a substantially horizontal cut off wire movable in the space between the top of the mold and the bottom of the nozzle for cutting through the projecting end of the stub close to and above the top of the mold to drop the charge in upright position on the floor of the molding cavity and fluid pressure means operable to rapidly extrude a predetermined amount of material inside the molding cavity when the cavity comes into a position of registration with the nozzle.

2. Apparatus for feeding clay charges to hollow ware molds, comprising in combination, conveying means for advancing a line of hollow ware pottery molds along a path wherein clay is fed thereto, open top, cavitous pottery molds disposed thereon, a clay discharge nozzle through which clay is fed located above the general path of the molds having the discharge end thereof located in close proximity to the cavity inlet of the molds resting on the conveying apparatus in order to extrude clay directly into the molding cavity and into close adjacency to the floor of the molding cavity, a substantially horizontal cut off wire, means for moving the wire arranged to cut off a charge of clay close to and above the top of the mold to thereby drop the charge in upright position on the floor of the molding cavity through the projecting end of the extrusion, means for intermittently advancing said conveying means to bring the molds, one after the other to the feeding position, and means operable to halt the extrusion after a predetermined quantity of clay has been extruded inside the molding cavity.

3. Apparatus for feeding clay charges to hollow ware molds, comprising in combination with conveying means for advancing a line of hollow ware pottery molds along a path wherein clay is fed thereto, open top, cavitous pottery molds disposed thereon, a clay discharge nozzle through which clay is fed located above the general path of the molds having the discharge end thereof located in close proximity to the cavity inlet of the molds resting on the conveying means in order to extrude clay directly into the molding cavity and in close adjacency to the floor of the cavity, a substantially horizontal cut off wire operating in the clearance space between the tip of the nozzle and the top of the mold operable to cut off and drop clay charges in upright position onto the center of the floor of the molding cavity, means for moving the wire through the projecting end of the extrusion, means for intermittently advancing the conveying means to transport the molds, one after the other, to the feeding position, fluid pressure operated means for moving the clay through the nozzle, and means for interrupting the discharge of clay through the nozzle after a predetermined quantity has been extruded inside the molding cavity and restarting the extrusion after the projecting end of the extrusion has been cut off and the next mold in line brought into position below the discharge nozzle.

4. Apparatus for feeding clay charges to hollow ware molds, comprising in combination with conveying means for advancing a line of hollow ware molds along a path wherein clay is fed thereto, open top, cavitous pottery molds disposed thereon, a tube having a clay discharge nozzle located thereabove with the tip of the nozzle in close proximity to the cavity inlet of the molds resting on the conveying means in order to extrude clay inside the molding cavity into close adjacency to the floor of the cavity, a substantially horizontal cut off wire operating in the clearance space provided operable to cut off the projecting end of the extrusion close to the tip of the nozzle and the top of the cavity to drop the charge into upright position on the floor of the cavity, means for intermittently advancing the conveying means to transport the molds, one after the other, to the feeding position, a plunger for extruding clay through the nozzle, fluid pressure operated means for moving the plunger forwardly to force clay through the tube, and means for interrupting the forward travel of the plunger after a predetermined amount of clay has been extruded inside the mold cavity and restarting the plunger after the clay inside the cavity has been cut off and the next mold in line has been moved into feeding position.

5. A method of feeding clay to a hollow ware mold which comprises, bringing the mold into close proximity and register with an extrusion outlet, pumping a quantity of pressure fluid into a piston chamber to thereby extrude a proportional amount of clay through the outlet and downwardly inside the molding cavity, stopping the delivery of pressure fluid before the clay touches the bottom of the cavity and cutting off the material close to and above the top of the cavity to drop the charge into upright position on the floor of the cavity.

6. A method of feeding clay to a succession of hollow ware molds which comprises, extruding a column of clay in a downwardly direction inside the molding cavity into close proximity to the bottom of the molding cavity, stopping the extrusion before the clay touches the bottom of the cavity and cutting through the extruded material close to and above the top of the mold to drop the charge into upright, centered position on the floor of the cavity and then moving another mold into feeding position and restarting the extrusion.

7. Apparatus for feeding cylindrical charges of clay to cavitous, hollow ware pottery molds in upright centered position on the floor of the molding cavity which comprises means for advancing hollow ware molds along a path where clay is fed thereto, open top cavitous pottery molds disposed thereon, an extrusion outlet thereabove located in close proximity to the cavity inlet of the mold to extrude clay directly thereinto, a cut-off wire arranged to cut off the extrusion close to and above the top of the molding cavity to thereby drop the cut-off material onto the floor of the mold in upright centered position and means for intermittently extruding clay through said outlet.

8. Apparatus for feeding cylindrical charges to clay to hollow ware molds in centered upright position on the floor of the molding cavity which comprises, an extrusion nozzle and an elevatable mold support arranged in vertical registration, an open-top cavitous potteryware mold disposed on said support, the tip of the nozzle lying in close proximity to the cavity inlet of the mold in order that the clay may extrude directly thereinto and downwardly inside the molding cavity, the axis of the mold and the column of the clay being substantially co-axial, a cutting wire arranged to cut through the extrusion close to and above the top of the inlet to the molding cavity to thereby drop the charge in upright centered position on the floor of the molding cavity and means for intermittently extruding clay through the nozzle.

9. Apparatus for feeding cylindrical charges of clay to hollow ware molds in upright centered position on the floor of the molding cavity including an extrusion nozzle and a plurality of mold supports arranged to be brought substantially into vertical registration with said nozzle, open top cavitous hollow ware molds disposed in said supports, the tip of the nozzle lying in close proximity to the cavity inlet of the molds when in registration therewith in order to extrude clay downwardly inside the molding cavity, a cutting wire arranged to cut through the extrusion close to and above the upper limits of the molding cavity to drop the charge in upright centered position on the floor of the molding cavity, means for intermittently moving said mold supports into registration with the nozzle and means operable to intermittently extrude clay from the nozzle between intermittent movements of the molds.

10. A method of feeding cylindrical charges of clay to cavitous hollow ware molds and depositing the charges in upright centered position on the floor of the cavity which comprises, extruding a column of clay downwardly into the molding cavity in substantially vertical alignment with the axis of the mold until the end face of the column is in close proximity to the floor of the mold and then stopping the extrusion, cutting off the column of clay projecting into the cavity close to and above the uppermost limit of the molding cavity to thereby drop the charge in centered upright position on the floor of the molding cavity, removing the charged mold from registration with the column, replacing the charged mold with an emptied mold at the filling postion and then restarting the extrusion to initiate another mold charging cycle.

11. A method of feeding clay to a hollow ware mold which comprises, extruding a column of clay downwardly inside the molding cavity along a line offset relative to the vertical axis of the cavity, stopping the extrusion before the column touches the bottom of the cavity and then making a cut through the column close to and above the top of the cavity from the direction in which the column is offset to drop the charge into upright centered position on the floor of the molding cavity.

WILLIAM J. MILLER.
ALBERT J. WAHL.